United States Patent
Chao et al.

(10) Patent No.: US 9,689,465 B2
(45) Date of Patent: Jun. 27, 2017

(54) DUAL ROTARY CAM STRUCTURE

(71) Applicants: Wei-Chung Chao, Taichung (TW);
Yoshihisa Osawa, Aichi (JP)

(72) Inventors: Wei-Chung Chao, Taichung (TW);
Yoshihisa Osawa, Aichi (JP)

(73) Assignee: Autocam Technology Co. Ltd.,
Taichung (TW)

( * ) Notice: Subject to any disclaimer, the term of this patent is extended or adjusted under 35 U.S.C. 154(b) by 105 days.

(21) Appl. No.: 14/604,987

(22) Filed: Jan. 26, 2015

(65) Prior Publication Data

US 2016/0215854 A1    Jul. 28, 2016

(51) Int. Cl.
*F16H 37/06* (2006.01)
*F16H 1/16* (2006.01)
*F16H 1/22* (2006.01)

(52) U.S. Cl.
CPC ............. *F16H 1/225* (2013.01); *F16H 1/166* (2013.01)

(58) Field of Classification Search
CPC ........... F16H 1/163; F16H 1/166; F16H 1/225
USPC .................. 74/664, 665 GD, 424.5, 427
See application file for complete search history.

(56) References Cited

U.S. PATENT DOCUMENTS

| | | | | |
|---|---|---|---|---|
| 458,695 | A * | 9/1891 | Otto | F16H 1/225 74/427 |
| 2,195,911 | A * | 4/1940 | Zimmermann | B23Q 5/56 74/409 |
| 4,286,479 | A * | 9/1981 | Baumann | B23F 23/10 74/664 |
| 4,615,230 | A * | 10/1986 | Guichard | F16H 1/225 310/83 |
| 5,598,749 | A * | 2/1997 | Goto | B23Q 5/38 403/277 |
| 8,294,310 | B2 * | 10/2012 | Shimoyama | B60S 1/166 310/49.47 |
| 8,443,698 | B2 * | 5/2013 | Cafuta | B23Q 16/025 74/813 R |
| 2005/0115350 | A1 * | 6/2005 | Ohashi | B60N 2/0232 74/425 |

\* cited by examiner

*Primary Examiner* — Ha D Ho
(74) *Attorney, Agent, or Firm* — Che-Yang Chen; Law Offices of Scott Warmuth

(57) ABSTRACT

A dual rotary cam may include a first rotating unit, a second rotating unit, a first rod, a second rod and a transmission device. The transmission device has an active gear, two connecting gears, and two passive gears. The active gear is driven by a motor to drive the connecting gears. A decelerating gear that is co-axially disposed with the connecting gear is used to connect the passive gears. The passive gears co-axially connect with the connecting portions of the first rod and second rod. The gear motion between the active gear, connecting gears, passive gears and decelerating gear can be arranged to adjust the gaps therebetween to achieve a goal of seamless transmission of the rotary cam.

5 Claims, 5 Drawing Sheets

DUAL ROTARY CAM STRUCTURE

FIELD OF THE INVENTION

The present invention is related to a rotary shaft structure, and more particularly to a dual rotary cam structure with a seamless transmission.

BACKGROUND OF THE INVENTION

Referring to FIG. 5, a conventional rotary cam has a rotating unit 60 having a plurality of passive wheels 61 located at an outer edge thereof. The passive wheels 61 are disposed radially with equal spaces in between. The rotating unit 60 is corresponding with a cam 70, both of which are disposed in a base 80. When the rotating unit 60 rotates, the passive wheels 61 is restricted and driven by the cam 70 to further drive the rotating unit 60 with the cam 70. However, the conventional rotary cam may be disadvantageous because the design of using single motor to drive a single rotating unit 60, which cannot meet the requirement of mass production. If using multiple rotary cam equipment, more spaces will be occupied and it may need to hire more operators. Furthermore, the precision of the gear engagement is very important for the rotary cam equipment. Therefore, there remains a need for a new and improved rotary cam structure with seamless transmission to overcome the problems stated above.

SUMMARY OF THE INVENTION

To solve the problems stated above, the present invention provides a dual rotary cam structure may include a first rotating unit, a second rotating unit, a first rod, a second rod and a transmission device. The first rotating unit has a plurality of rotating wheels radially disposed at a periphery of the first rotating unit, while the second rotating unit has a plurality of rotating wheels radially disposed at a periphery of the second rotating unit. The first rotating unit and second rotating unit are disposed toward the same direction, and each of the first rotating unit and second rotating unit has a plurality of slots and respectively for the rotating wheels and to plug in, and each of the rotating wheels has a shaft. One end of the first rod has a helical portion and the other end has a connecting portion, and one end of the second rod has a helical portion to engage with the rotating wheel of the second rotating unit. The other end of the second rod also has a connecting portion. The helical portions of the first and second rods engage with the shafts respectively, and an outer circle formed by the helical portions and rotating wheels is recessed. The transmission device has an active gear, two connecting gears and two passive gears. The active gear is driven by a motor to drive the connecting gears. A decelerating gear that is co-axially disposed with the connecting gear is used to connect the passive gears. The passive gears co-axially connect with the connecting portions of the first rod and second rod. Since the teeth number of the passive gear is greater than that of the connecting gear and active gear, and the teeth number of the connecting gear is greater than that of the decelerating gear and active gear, the gear motion between the active gear, connecting gears, passive gears and decelerating gear can be arranged to achieve a goal of seamless transmission.

Comparing with conventional gardening scissors, the present invention is advantageous because the first and second rotating units, and the first and second rods have to maintain a seamless transmission, the transmission device uses the active gear, connecting gears, passive gears and the decelerating gear (all with slanted teeth), so the gap between the gears in the transmission device can be adjusted through axial movement of the gears to achieve the seamless transmission, as well as the goal of using a single motor to drive both first and second rotating units.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
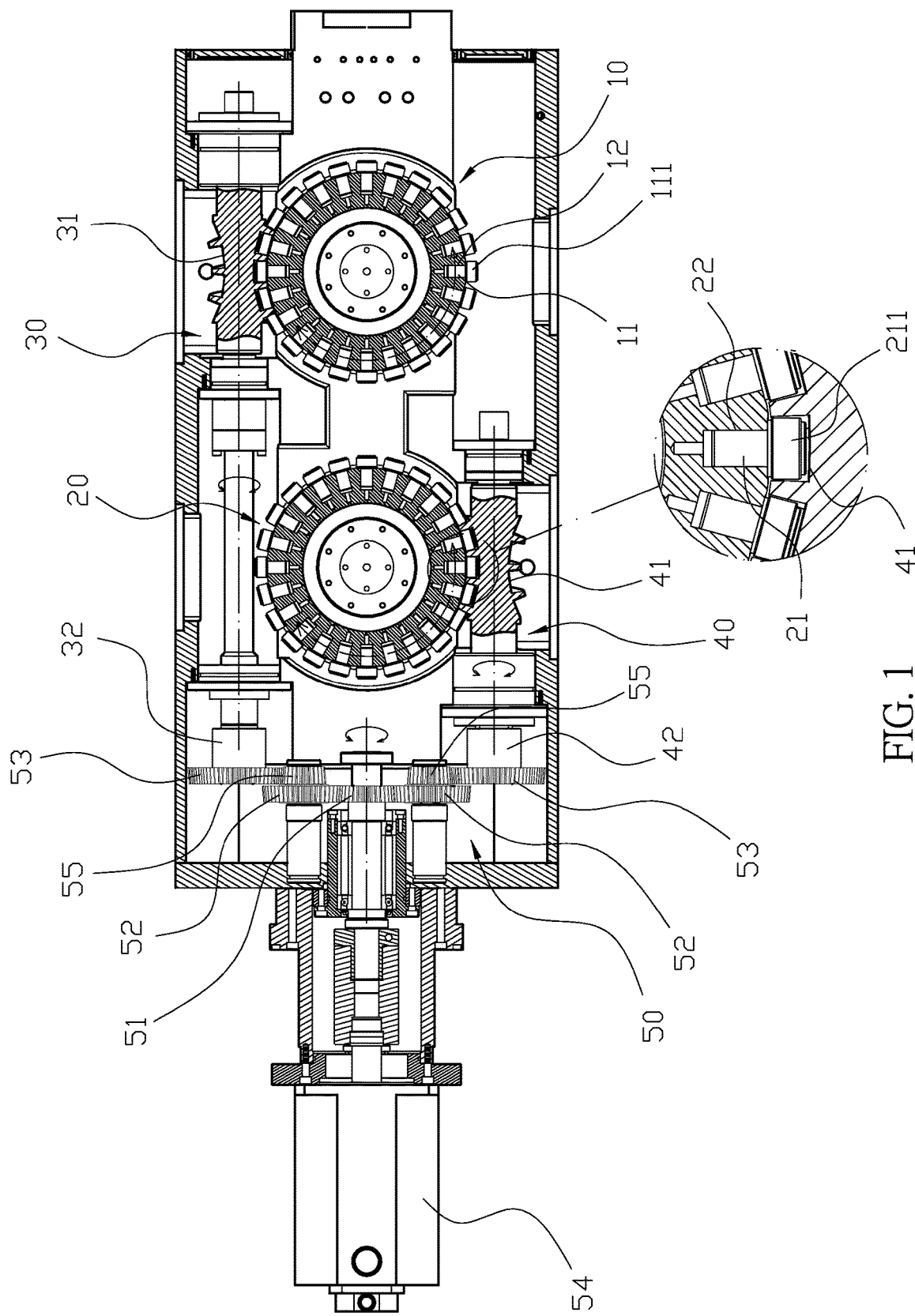
FIG. 1 illustrates a sectional and enlarged view of the dual rotary cam in the present invention.
Figure 2:
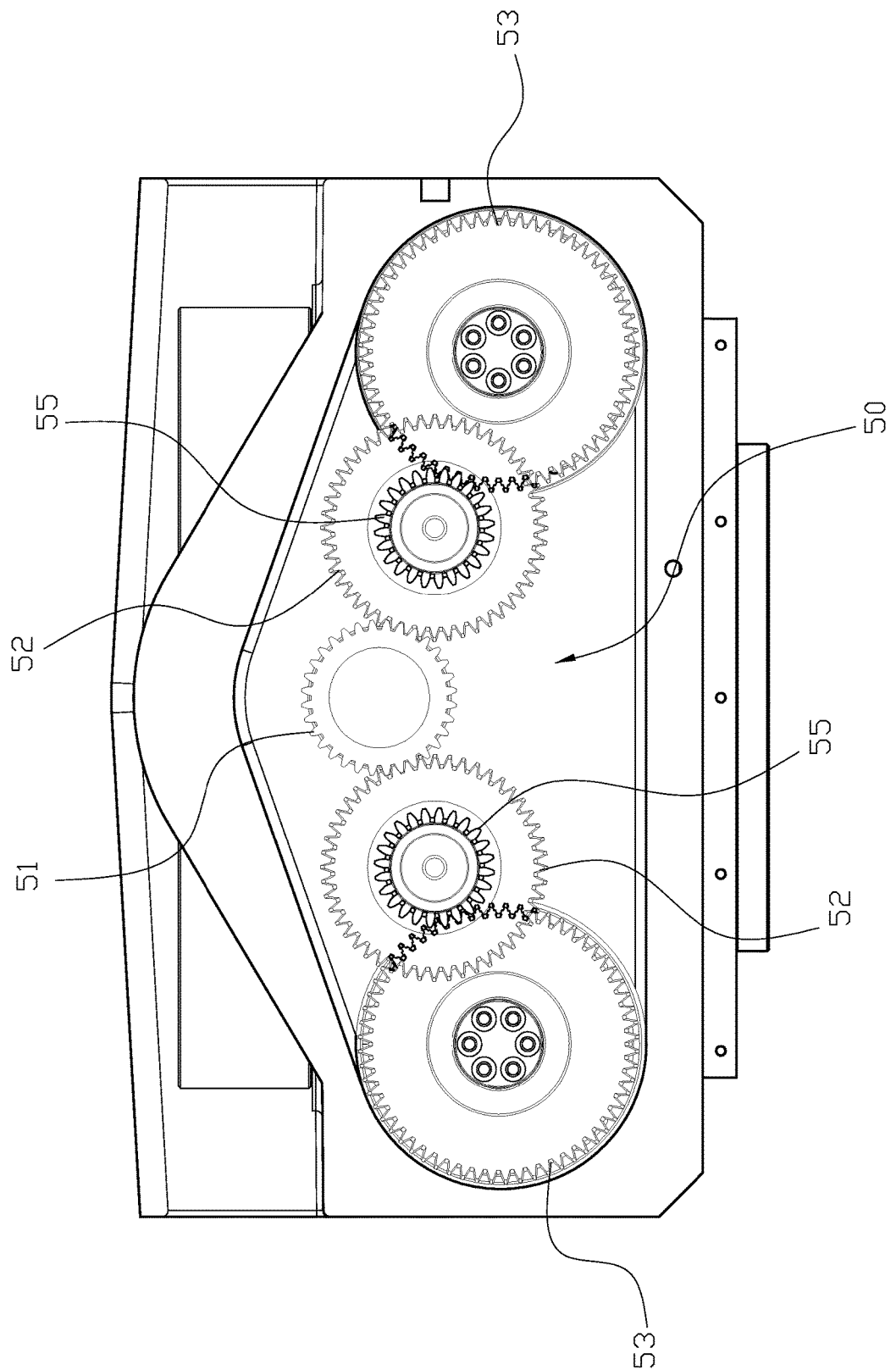
FIG. 2 illustrates a schematic view of the transmission in the present invention.

In order to further understand the goal, characteristics and effect of the present invention, a number of embodiments along with the drawings are illustrated as following:

Referring to FIGS. 1 and 2, a dual rotary cam structure may include a first rotating unit 10, a second rotating unit 20, a first rod 30, a second rod 40 and a transmission device 50. The first rotating unit 10 has a plurality of rotating wheels 11 radially disposed at a periphery of the first rotating unit 10, while the second rotating unit 20 has a plurality of rotating wheels 21 radially disposed at a periphery of the second rotating unit 20. The first rotating unit 10 and second rotating unit 20 are disposed toward the same direction, and each of the first rotating unit 10 and second rotating unit 20 has a plurality of slots 12 and 22 respectively for the rotating wheels 11 and 21 to plug in, and each of the rotating wheels 11 and 21 has a shaft 111 and 211. One end of the first rod 30 has a helical portion 31 and the other end has a connecting portion 32, and one end of the second rod 40 has a helical portion 41 to engage with the rotating wheel 21 of the second rotating unit 20. The other end of the second rod 40 also has a connecting portion 42. The helical portions 31 and 41 of the first and second rods 30 and 40 engage with the shafts 111 and 211 respectively, and an outer circle formed by the helical portions 31 (41) and rotating wheels 11 (21) is recessed. The transmission device 50 has an active gear 51, two connecting gears 52, and two passive gears 53. The active gear 51 is driven by a motor 54 to drive the connecting gears 52. A decelerating gear 55 that is co-axially disposed with the connecting gear 52 is used to connect the passive gears 53. The passive gears 53 co-axially connect with the connecting portions 32 and 42 of the first rod 30 and second rod 40. Since the teeth number of the passive gear 53 is greater than that of the connecting gear 52 and active gear 51, and the teeth number of the connecting gear 52 is greater than that of the decelerating gear 55 and active gear 51, the gear motion between the active gear 51, connecting gears 52, passive gears 53 and decelerating gear 55 can be arranged to adjust the gaps therebetween to achieve a goal of seamless transmission.

When in use, referring to FIGS. 1 and 2, the present invention is configured to integrate two rotating units (the first rotating unit 10 and second rotating unit 20). The motor 54 is used to drive the active gear 51 to drive the connecting gears 52 to generate a first stage deceleration. Furthermore, the connecting gears 52 drive the co-axial decelerating gears 55 to generate a second stage deceleration. In other words, the connecting portion 32 of the first rod 30 can rotate simultaneously with the passive gear 53, and since the helical portion 31 of the first rod 30 seamlessly engages with the shaft 111 of the rotating wheel 11, the first rotating wheel 10 can stably rotate. Meanwhile, the other passive gear 53 can drive the second rod 40 through the connecting portion 42, so the helical portion 41 of the second rod 40 can drive the second rotating unit 20 through the rotating wheel 21 to achieve the goal of using a single motor to drive both first and second rotating units 10 and 20.

Figure 3:
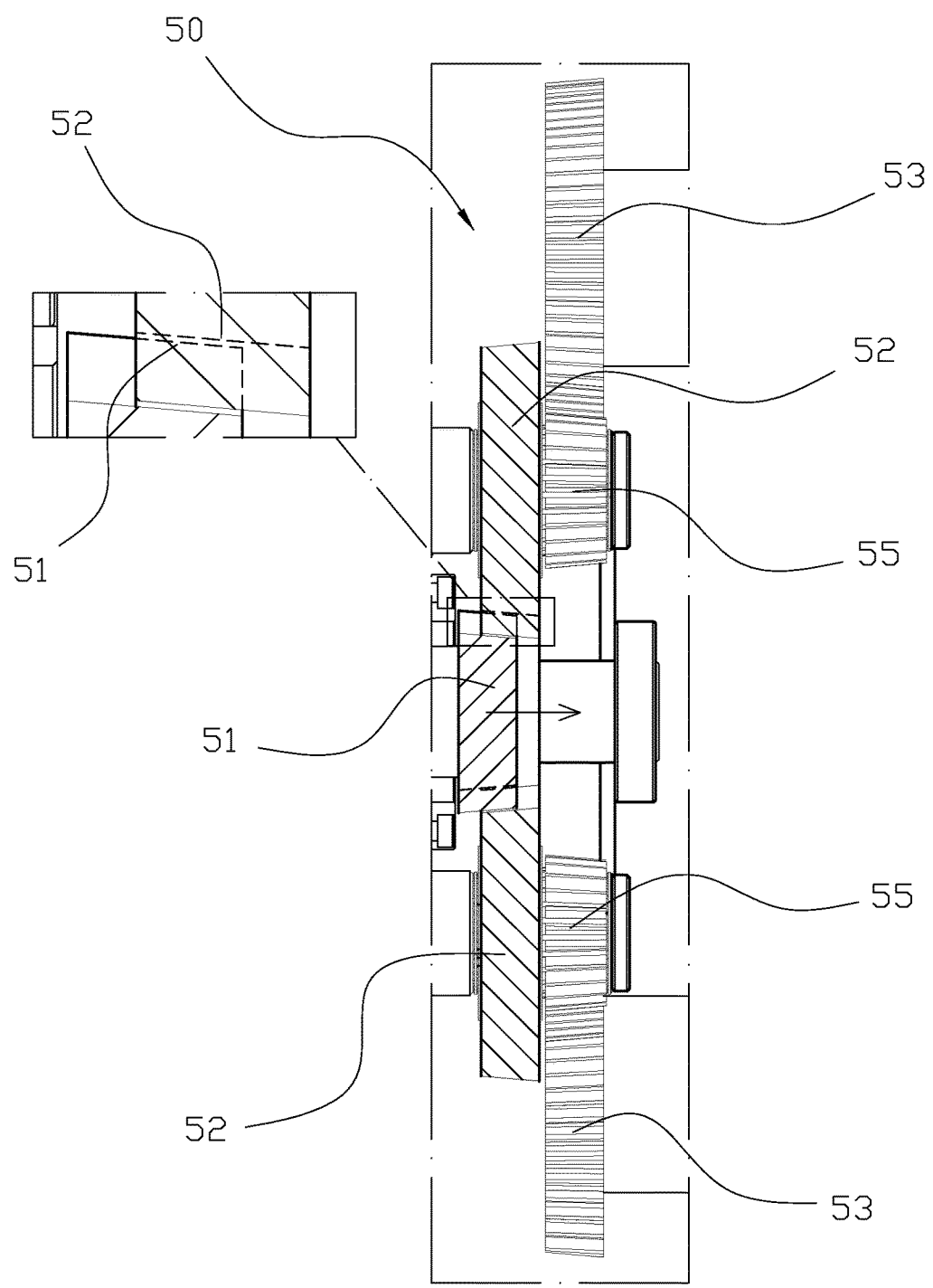
FIG. 3 illustrates a schematic view of gap adjustment of the transmission device in the present invention.
Figure 4:
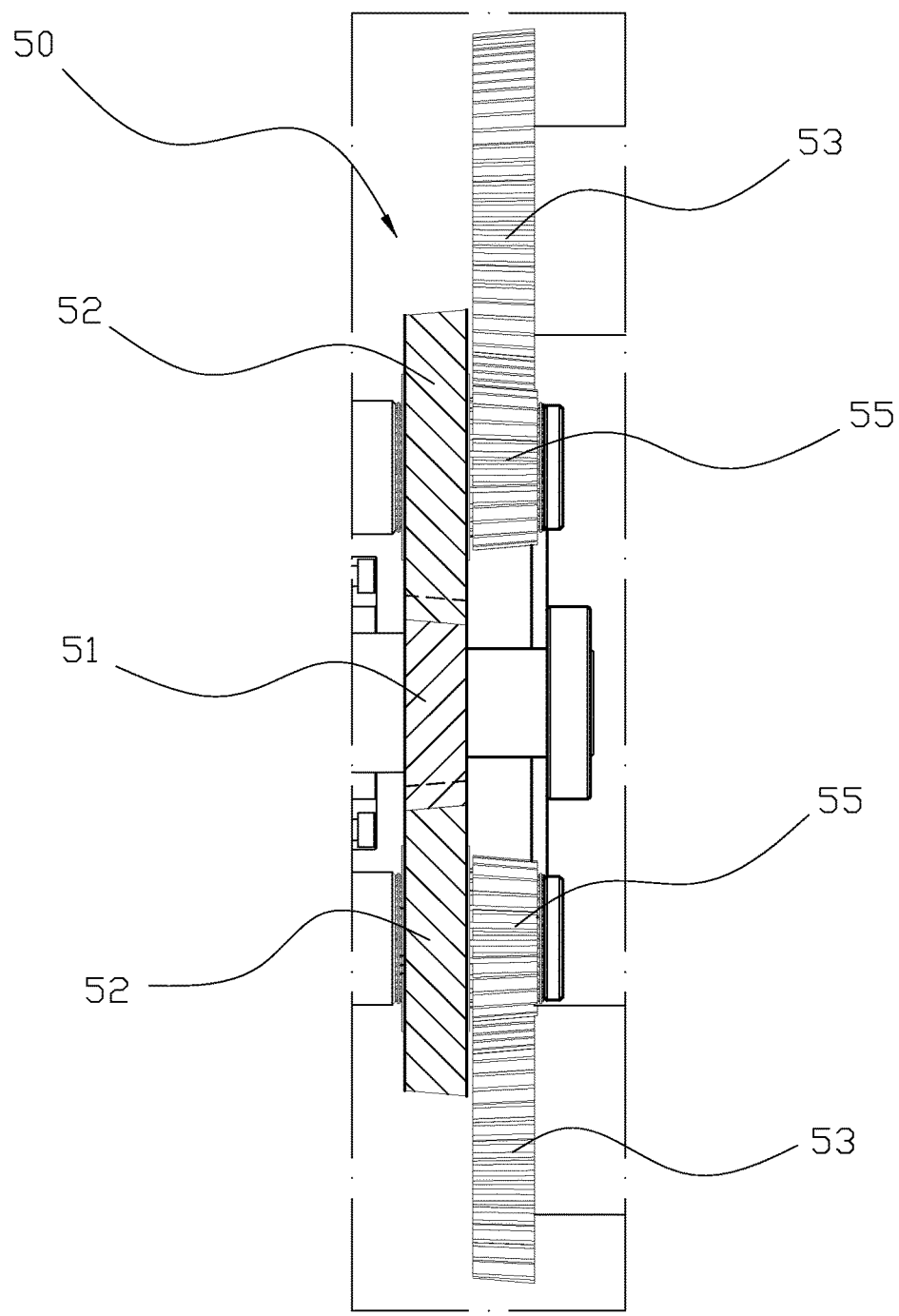
FIG. 4 illustrates another schematic view of gap adjustment of the transmission device in the present invention.
Figure 5:
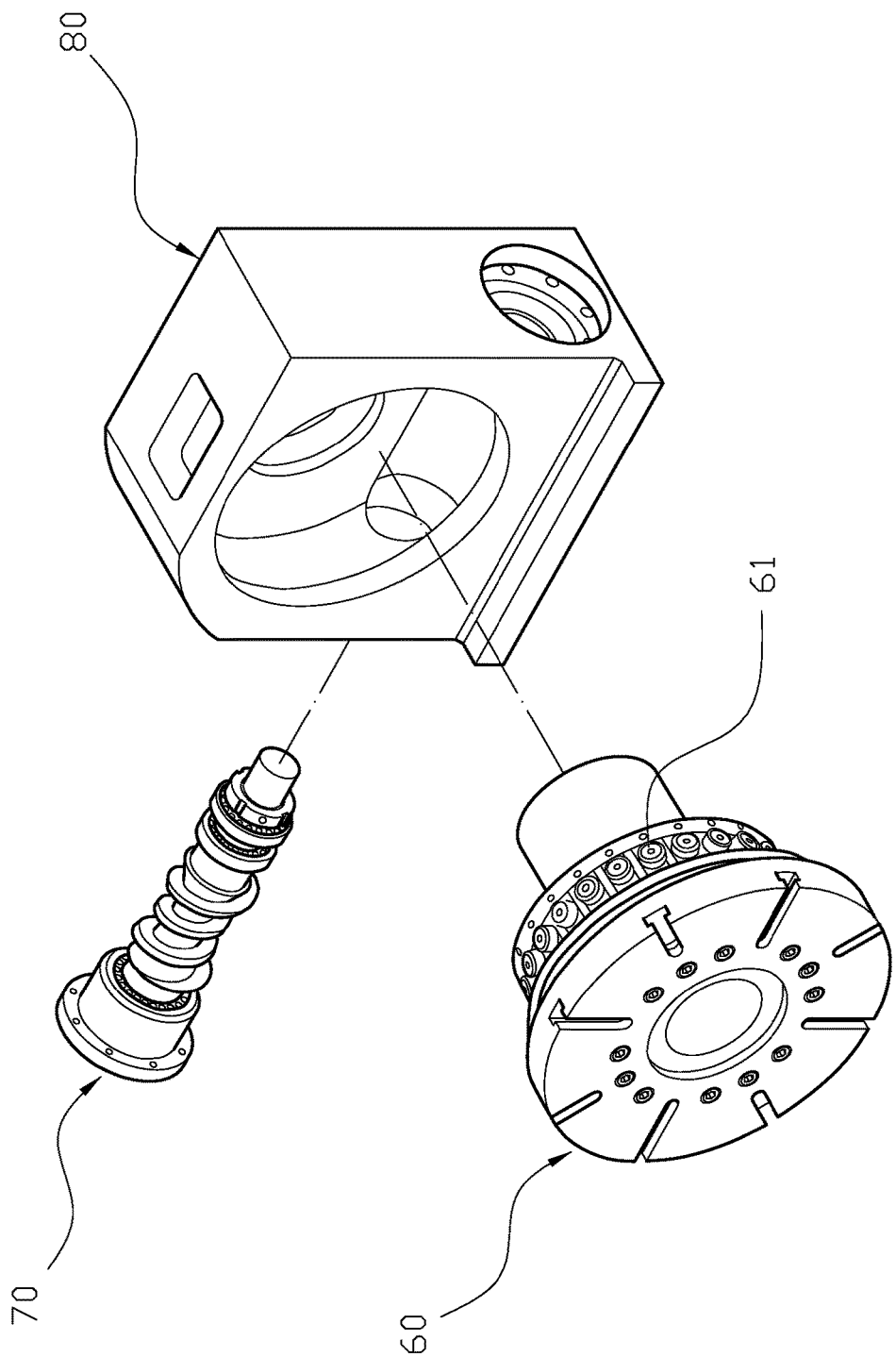
FIG. 5 is an exploded view of a prior art.

Referring to FIGS. 3 and 4, since the first and second rotating units 10 and 20, and the first and second rods 30 and 40 have to maintain a seamless transmission, the transmission device 50 uses the active gear 51, connecting gears 52, passive gears 53 and the decelerating gear 55, all of which have slanted teeth. The gap between the gears in the transmission device 50 can be adjusted through axial movement of the gears to achieve the seamless transmission, as well as the goal of using a single motor to drive both first and second rotating units 10 and 20.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A dual rotary cam structure comprising:
   a first rotating unit having a plurality of rotating wheels radially disposed at a periphery thereof;
   a second rotating unit having a plurality of rotating wheels radially disposed at a periphery thereof, said first rotating unit and second rotating unit disposed toward the same direction;
   a first rod, one end of which having a helical portion to engage with the rotating wheels of the first rotating unit, and the other end of which having a connecting portion;
   a second rod, one end of which having a helical portion to engage with the rotating wheels of the second rotating unit, and the other end of which having a connecting portion; and
   a transmission device having an active gear, two connecting gears, and two passive gears, wherein the active gear is driven by a motor to drive the connecting gears, and a decelerating gear that is co-axially disposed with the connecting gear is used to connect the passive gears, and the passive gears co-axially connect with the connecting portions of the first rod and second rod, and the active gear, connecting gears, passive gears and decelerating gear are configured to adjust gaps therebetween to achieve a seamless transmission.

2. The dual rotary cam structure of claim 1, wherein each of the first rotating unit and second rotating unit has a plurality of slots for the rotating wheels of the first rotating unit and second rotating unit to plug in.

3. The dual rotary cam structure of claim 1, wherein each of the rotating wheels of the first rotating unit and second rotating unit has a shaft to engage with the helical portions of the first rod and second rod respectively.

4. The dual rotary cam structure of claim 1, wherein an outer circle formed by the helical portions and rotating wheels is recessed.

5. The dual rotary cam structure of claim 1, wherein the number of teeth of the passive gears is greater than that of the connecting gears and active gear, and the number of teeth of the connecting gear is greater than the active gear and decelerating gear.

* * * * *